US012670845B2

(12) United States Patent
Ko et al.

(10) Patent No.: US 12,670,845 B2
(45) Date of Patent: Jun. 30, 2026

(54) DISPLAY APPARATUS

(71) Applicant: LG Display Co., Ltd., Seoul (KR)

(72) Inventors: Intae Ko, Daegu (KR); SangMoo Song, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/642,278

(22) Filed: Apr. 22, 2024

(65) Prior Publication Data

US 2024/0379050 A1 Nov. 14, 2024

(30) Foreign Application Priority Data

May 8, 2023 (KR) ........................ 10-2023-0059153

(51) Int. Cl.
*G09G 3/32* (2016.01)

(52) U.S. Cl.
CPC ....... *G09G 3/32* (2013.01); *G09G 2310/0267* (2013.01); *G09G 2310/0297* (2013.01); *G09G 2380/02* (2013.01)

(58) Field of Classification Search
CPC ........ B60K 35/20–29; B60K 35/00–90; B60K 37/00–20; B60K 2360/00–96; B60K 35/22; G09G 3/3266; G09G 2310/0267; G09G 3/3225; G09G 2300/026; G09G 2300/0408; G09G 2300/0426; G09G 2310/0297; G09G 2320/068; G09G 2380/02; G09G 2380/10; G09G 2320/0223; G09G 3/3674; G09G 3/3677; G09G 2300/0804; G09G 2310/0221; G09G 2310/06; G09G 2310/067; G09G 2310/08; G09G 2230/00; G09G 3/3644; G09G 3/3666; G09G 2310/0232; G09G 3/32; G11C 19/28–287; H10K 59/131; H10K 59/18; H10K 59/80; H10K 59/12; G02F 1/13336; G02F 1/13452; G06F 1/165; G06F 3/1446; G06F 1/1647; G09F 9/30; G09F 9/3026; H01L 25/0753; H05K 1/028; H05K 1/147; H05K 5/0018; H05K 5/0217; H05K 2201/055; H05K 1/148; H05K 2201/052; H05K 2201/10128; H05K 2201/10136; H05K 1/189
See application file for complete search history.

(56) References Cited

U.S. PATENT DOCUMENTS

| | | | | |
|---|---|---|---|---|
| 2009/0256813 A1* | 10/2009 | Amici | .................... | B60K 35/00 345/173 |
| 2018/0314354 A1* | 11/2018 | Tang | .................... | G09G 3/3208 |
| 2019/0266933 A1* | 8/2019 | Lee | ...................... | G09G 3/2092 |

(Continued)

FOREIGN PATENT DOCUMENTS

KR 10-2020-0075410 A 6/2020

*Primary Examiner* — Amr A Awad
*Assistant Examiner* — Aaron Midkiff
(74) *Attorney, Agent, or Firm* — Fenwick & West LLP

(57) ABSTRACT

A display apparatus is disclosed. The display apparatus comprises a display panel including a first area and a second area extending from a first side of the first area, and a plurality of flexible films connected to the display panel. A distance between a first end and a second end of the first area is less than a distance between a first end and a second end of the second area and the plurality of flexible films are connected to the first end of the first area and the first end of the second area.

20 Claims, 10 Drawing Sheets

(56) References Cited

U.S. PATENT DOCUMENTS

| | | | | |
|---|---|---|---|---|
| 2020/0320959 | A1* | 10/2020 | Ryu | G09G 3/3275 |
| 2021/0358347 | A1* | 11/2021 | Jiang | H10H 20/857 |
| 2022/0149083 | A1* | 5/2022 | Son | H10D 86/60 |
| 2022/0310662 | A1* | 9/2022 | Cha | G06F 3/1446 |
| 2023/0075430 | A1* | 3/2023 | Kim | G06F 1/1677 |

* cited by examiner

DISPLAY APPARATUS

CROSS-REFERENCE TO RELATED APPLICATION

This application claims the priority of Republic of Korea Patent Application No. 10-2023-0059153 filed on May 8, 2023, in the Korean Intellectual Property Office, which is hereby incorporated by reference in its entirety.

BACKGROUND

Field

The present disclosure relates to a display apparatus, and more particularly, to a display apparatus having a heterogeneous structure.

Description of the Related Art

A display apparatus may be used for various types of devices, such as televisions (TVs), monitors, tablet computers, navigations, game consoles, and mobile phones. As such a display apparatus, various types of display devices, such as a liquid crystal display (LCD) device or an organic light emitting display (OLED) device, have been used.

In the meantime, a printed circuit board which is bonded on the substrate is disposed on one side of the display apparatus. The area in which the printed circuit board is disposed is an area in which images are not actually displayed and when the area is disposed on the front surface of the display apparatus, a bezel to block the area is necessary. Therefore, in order to minimize the bezel area, a technique of bending one side of the substrate on which the printed circuit board is disposed to the rear side is being developed.

SUMMARY

An object to be achieved by the present disclosure is to provide a display apparatus which reduces recognition of a bezel area.

Another object to be achieved by the present disclosure is to provide a display apparatus which reduces a resistor-capacitor (RC) load difference in a display apparatus having a heterogeneous structure.

Objects of the present disclosure are not limited to the above-mentioned objects, and other objects, which are not mentioned above, can be clearly understood by those skilled in the art from the following descriptions.

According to one embodiment, a display apparatus, comprises: a display panel including a first area and a second area extending from a first side of the first area; and a plurality of flexible films connected to the display panel, wherein a distance between a first end and a second end of the first area is less than a distance between a first end and a second end of the second area, wherein the plurality of flexible films are connected to the first end of the first area and the first end of the second area but not the second end of the first area and the second end of the second area.

According to one embodiment, a display apparatus comprises: a display panel including a first area and a second area extending from a first side of the first area; and a plurality of flexible films connected to the display panel, wherein a lower end of the second area protrudes past a lower end of the first area, and the plurality of flexible films are connected to the lower end of the first area and the lower end of the second area.

According to one embodiment, a display device comprises: a display panel including a first area and a second area extending from a first side of the first area that extends in a first direction such that a second side of the second area that extends in a second direction that is different from the first direction protrudes past a second side of the first area in a plan view of the display device, the second area larger than the first area; a plurality of flexible films connected to the second side of the first area and the second side of the second area; a gate driver configured to supply a scan signal; a plurality of first link lines in the first area having a first length, the plurality of first link lines applying the scan signal to the first area; a plurality of second link lines in the second area having a second length that is shorter than the first length, the plurality of second link lines applying the scan signal to the second area; and a plurality of compensation patterns that connect the gate driver to the plurality of second link lines in the second area, the plurality of compensation patterns having a third length that is longer than the second length.

Other detailed matters of the exemplary embodiments are included in the detailed description and the drawings.

According to the present disclosure, a bezel area is reduced on top of the display apparatus to reduce a visibility of the bezel of the display apparatus.

According to the present disclosure, a RC load difference in the display apparatus having a heterogeneous structure may be reduced.

The effects according to the present disclosure are not limited to the contents exemplified above, and more various effects are included in the present specification.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
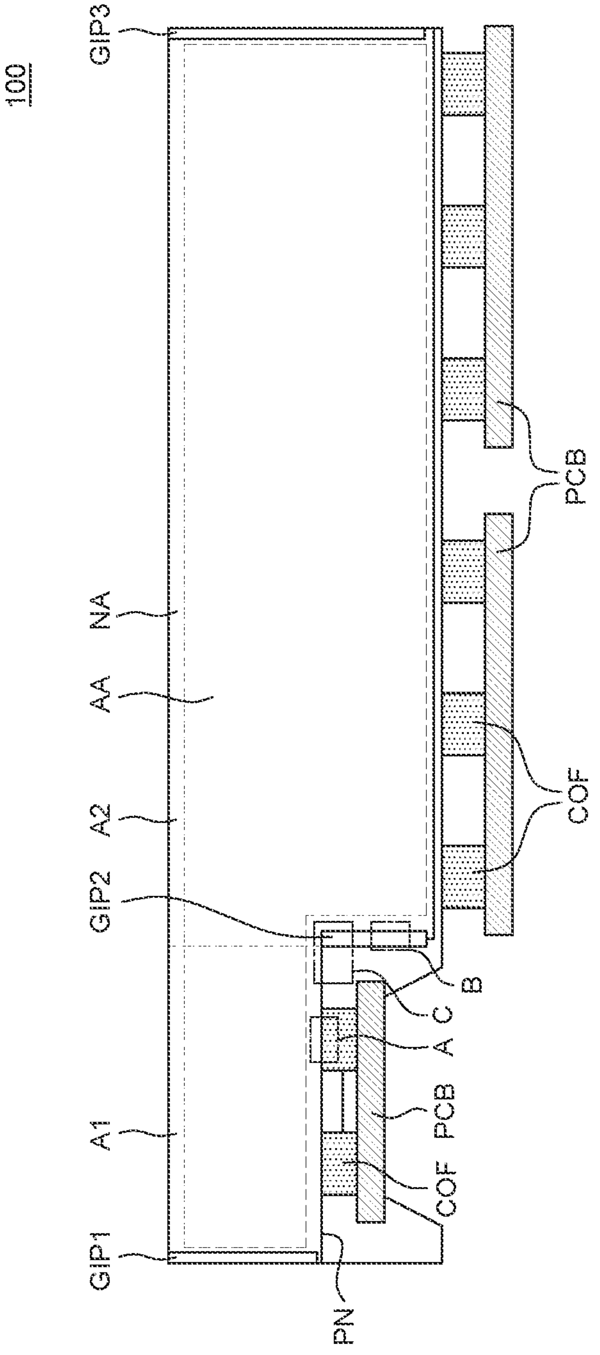
FIG. 1 is a schematic plan view of a display apparatus according to an exemplary embodiment of the present disclosure.

Advantages and characteristics of the present disclosure and a method of achieving the advantages and characteristics will be clear by referring to exemplary embodiments described below in detail together with the accompanying drawings. However, the present disclosure is not limited to the exemplary embodiments disclosed herein but will be implemented in various forms. The exemplary embodiments are provided by way of example only so that those skilled in the art can fully understand the disclosures of the present disclosure and the scope of the present disclosure.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "comprising" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts unless the terms are used with the term "immediately" or "directly".

When an element or layer is disposed "on" another element or layer, another layer or another element may be interposed directly on the other element or therebetween.

Although the terms "first", "second", and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other.

Hereinafter, a display apparatus according to exemplary embodiments of the present disclosure will be described in detail with reference to accompanying drawings.

FIG. 1 is a schematic plan view of a display apparatus according to an exemplary embodiment of the present disclosure. Referring to FIG. 1, a display apparatus 100 includes a display panel PN, a plurality of flexible films COF, and gate drivers GIP1, GIP2, and GIP3.

In the display panel PN, an active area AA and a non-active area NA enclosing the active area AA may be defined. The active area AA is an area in which an image is actually displayed in the display apparatus 100 and a light emitting diode to be described below and various driving elements for driving the light emitting diode are disposed in the active area AA. The non-active area NA is an area where images are not displayed so that the non-active area NA may be defined as an area enclosing the active area AA. Various components for driving a plurality of sub pixels disposed in the active area AA may be disposed in the non-active area NA.

The active area AA is an area where images are displayed. In the active area AA, a plurality of sub pixels including light emitting diodes and driving circuits may be disposed to display images.

The non-active area NA is an area where no image is displayed and various wiring lines, drivers, and the like for driving the sub pixels disposed in the active area AA are disposed. For example, in the non-active area NA, various drivers, such as gate drivers GIP1, GIP2, and GIP3 and a data driver, may be disposed.

The display panel PN includes a first area A1 and a second area A2 extending from one side of the first area A1. In the present disclosure, the display panel PN is described as a display panel for a vehicle which is applied to the vehicle, but is not limited thereto.

The first area A1 is a screen for a driver and may be disposed in front of the driver. For example, the first area A1 may be an area which is disposed in front of a driver seat. The first area A1 may display information required for a driver to drive.

The second area A2 is a screen for a passenger and may be disposed on an area other than the front of the driver. For example, the second area A2 may be an area which is disposed between a driver seat and a front passenger seat and in front of the front passenger seat. The second area A2 may display images required for the driver or the passenger.

An interval (e.g., a first distance) between a first end and a second end of the first area A1 may be smaller than an interval (e.g., a second distance) between a first end and a second end of the second area A2. For example, the second end of the first area A1 and the second end of the second area A2 corresponding to an upper end portion of the display panel PN are located on the same line (e.g., aligned with each other) and the first end of the first area A1 corresponding to a lower end of the display panel PN may be located inside more than (e.g., inset from) the first end of the second area A2. That is, for example, the lower end of the second area A2 may be disposed in a step form protruding downwardly from the lower end of the first area A1. That is, the lower end (e.g., the first end) of the second area A2 protrudes past the lower end (e.g., the first end) of the first area A1.

The second area A2 is inwardly recessed toward an upper direction of the active area AA more than the first area A1 so that the second area A2 may have a display area different from that of the first area A1.

In the recessed area between the first area A1 and the second area A2, an independent configuration from the display panel PN may be disposed. For example, when the display panel PN is a display panel for a vehicle, the first area A1 may be disposed in front of the driver seat and the second area A2 may be disposed to extend to the front direction of the front passenger seat. At this time, a configuration required to manipulate a vehicle, such as a steering wheel for a vehicle, may be disposed in a lower end of the first area A1 disposed in front of the driver seat.

Even though it is not illustrated in FIG. 1, a pad unit may be disposed in the non-active area NA of the display panel PN. The pad unit may be electrically connected to the printed circuit board PCB to receive a data driving signal, or the like or exchange a touch signal with the external power source. Various driving signals, such as a driving signal or a data voltage may be supplied to the data driver through the pad unit.

In the exemplary embodiment, the data driver may be disposed in the non-active area NA. The data driver may supply a data signal to the plurality of sub pixels. For example, the data driver samples and latches the data signal supplied from the timing controller in response to a data timing control signal supplied from the timing controller to convert the data signal into a gamma reference voltage and output the converted gamma reference voltage. The data driver may output a data signal through a plurality of data lines.

A plurality of flexible films COF are connected to one end (e.g., the lower end) of the display panel PN. The plurality of flexible films COF are films in which various components are disposed on a base film having malleability to supply a signal to the plurality of sub pixels of the active area AA. The plurality of flexible films COF are disposed in one end of the non-active area NA of the display panel PN to supply a data voltage, and the like to the plurality of sub pixels of the active area AA.

Drivers, such as gate drivers GIP1, GIP2, and GIP3 and a data driver, may be disposed in the plurality of flexible films COF. The driving IC is a component which processes data for displaying images and a driving signal for processing the data. The driving IC may be disposed by a chip on glass (COG), a chip on film (COF), a tape carrier package (TCP) technique, or the like depending on a mounting method, but is not limited thereto.

The plurality of flexible films COF may be connected to a lower end of the first area A1 and a lower end of the second area A2. Therefore, a bezel above the display panel PN in which the plurality of flexible films COF are not disposed may be narrower than a bezel below the display panel PN in which the plurality of flexible films COF is disposed.

In the meantime, shapes and the number of the plurality of flexible films COF illustrated in FIG. 1 are illustrative and the shapes and the number of the flexible films COF may be changed in various forms, but are not limited thereto.

The printed circuit board PCB is connected to the plurality of flexible films COF. The printed circuit board PCB is a component which supplies signals to the driving IC. Various components may be disposed in the printed circuit board PCB to supply various driving signals such as a driving signal or a data voltage to the driving IC.

The gate drivers GIP1, GIP2, and GIP3 are disposed in the non-active area NA. The gate drivers GIP1, GIP2, and GIP3 are disposed on a side surface of the active area AA to output a gate signal and an emission control signal under the control of the timing controller to select a sub pixel in which a data voltage is charged through a wiring line such as a gate line or an emission control signal line and adjust an emission timing. The gate drivers GIP1, GIP2, and GIP3 shift a scan signal and an emission control signal using a shift register to sequentially supply the gate signals and the emission control signals. The gate drivers GIP1, GIP2, and GIP3 may be formed in a gate-driver in panel (GIP) manner as illustrated in FIG. 1, but are not limited thereto.

The gate drivers GIP1, GIP2, and GIP3 may be disposed in an outer periphery of the display panel PN in a column direction.

The gate drivers GIP1, GIP2, and GIP3 may include a first gate driver GIP1 disposed in a left area of the first area A1, a second gate driver GIP2 disposed in a left area of the second area A2, and a third gate driver GIP3 disposed in a right area of the second area A2. As shown in FIG. 1, the second area A2 extends from a first side (e.g., a right side) of the first area A1. The first gate driver G1P1 is disposed at a second side (e.g., the left side) of the first area A1 that is spaced apart from the first side of the first area A1, the second gate driver GIP2 is disposed at a second side (e.g., the left side) of the second area A2 that is aligned with the first side of the first area A1, and the third gate drive GIP3 is disposed at a first side (e.g., a right side) of the second area A2 that is spaced apart from the second side of the second area A2.

The first gate driver GIP1 and the second gate driver GIP2 may be directly connected to a plurality of gate link lines.

The first area A1 may be applied with a gate signal from the first gate driver GIP1 and the third gate driver GIP3. The second area A2 may include an area in which a gate signal is applied from the first gate driver GIP1 and the third gate driver GIP3 but not the second gate driver GIP2, and an area in which a gate signal is applied from the second gate driver GIP2 and the third gate driver GIP3. For example, an area of the second area A2 disposed between the first gate driver GIP1 and the third gate driver GIP3 may be driven by a gate signal applied from the first gate driver GIP1 and the third gate driver GIP3. An area of the second area A2 disposed between the second gate driver GIP2 and the third gate driver GIP3 may be driven by a gate signal applied from the second gate driver GIP2 and the third gate driver GIP3.

The first gate driver GIP1 and the second gate driver GIP2 may be separately driven for one frame time and may be driven at different timings.

Details of the driving of the gate drivers GIP1, GIP2, and GIP3 will be described below with reference to FIG. 8.

Figure 2A:
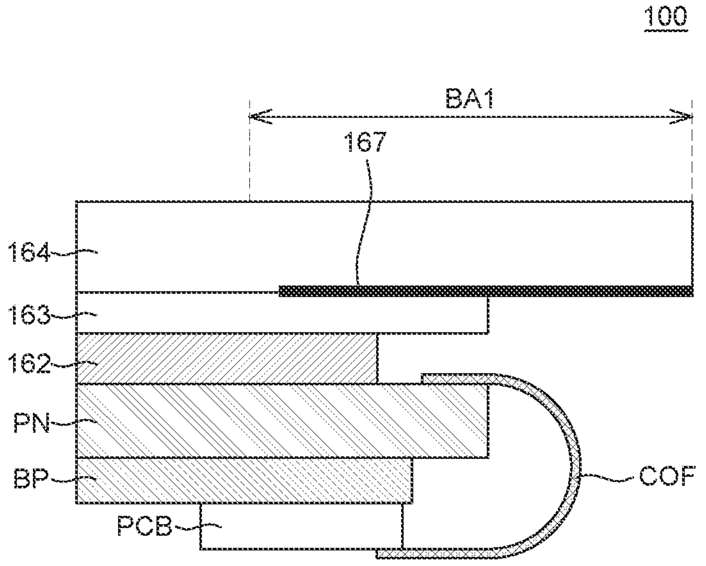
FIGS. 2A and 2B are cross-sectional views of a display apparatus according to an exemplary embodiment of the present disclosure.
Figure 2B:
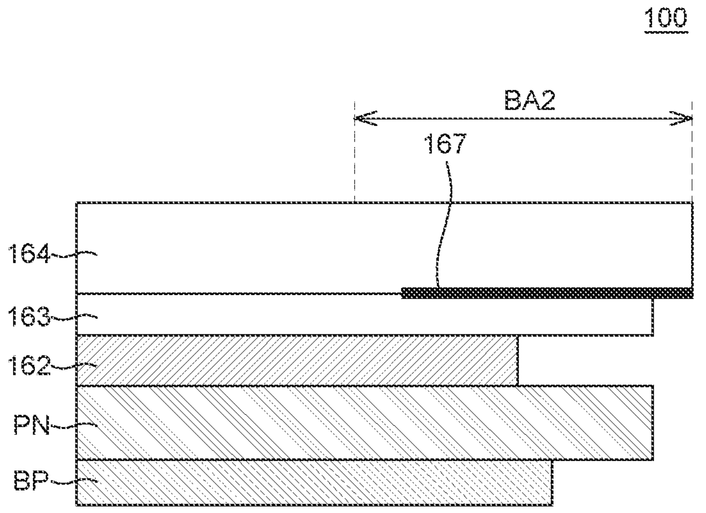

FIGS. 2A and 2B are cross-sectional views of a display apparatus according to an exemplary embodiment of the present disclosure. FIG. 2A is a cross-sectional view for the first end in which a flexible film COF of a display panel PN is disposed and FIG. 2B is a cross-sectional view for the second end of the display panel PN. Further, in FIG. 2A, a bent state of the flexible film COF is illustrated. Referring to FIGS. 2A and 2B, the display apparatus 100 includes a cover glass 164, a light shielding pattern 167, an adhesive layer 163, a polarization plate 162, a display panel PN, a back plate BP, and a plurality of flexible films COF.

The polarization plate 162 may suppress the reflection of the external light on the active area AA. When the display apparatus 100 is used at the outside, external natural light enters to be reflected by a reflective layer included in an anode of a light emitting diode or reflected by an electrode which is formed of a metal and disposed below the light emitting diode. The image of the display apparatus 100 may not be visibly recognized due to the reflected light. The polarization plate 162 polarizes the light entering from the outside to a specific direction and suppresses the reflected light from being emitted to the outside of the display apparatus 100. The polarization plate 162 may be disposed on the active area AA, but is not limited thereto.

The polarization plate 162 may be configured by a polarizer and a protective film which protects the polarizer and may be formed by coating a polarization material for ensuring flexibility.

Referring to FIGS. 2A and 2B, the adhesive layer 163 is disposed above the polarization plate 162 to bond a cover glass 164 which protects an outer appearance of the display apparatus 100. The cover glass 164 is provided to cover the front surface of the display panel PN to protect the display panel PN.

The adhesive layer 163 may include an optically clear adhesive (OCA).

The light shielding pattern 167 may be disposed on four edges of the cover glass 164.

The light shielding pattern 167 may be disposed on a rear edge of the cover glass 164.

The light shielding pattern 167 may be disposed to overlap parts of the adhesive layer 163, the polarization plate 162, and the display panel PN there below.

The light shielding pattern 167 may be applied with black ink. However, it is not limited thereto and the light shielding pattern 167 may be implemented to include a light shielding film or a light shielding member.

A back plate BP may be disposed on a rear surface of the display panel PN. When the substrate of the display panel PN is formed of a plastic material such as polyimide, a manufacturing process of a display apparatus 100 is performed in a situation in which a support substrate configured by glass is disposed below the display panel PN. After completing the manufacturing process, the support substrate is separated to be released.

Even after releasing the support substrate, a component for supporting the display panel PN is required so that the back plate BP for supporting the display panel PN may be disposed on the rear surface of the display panel PN.

The back plate BP may suppress foreign materials from being attached to the lower portion of the substrate, and may serve to buffer shocks from the outside.

Referring to FIG. 2A, the plurality of flexible films COF may be bent and disposed in one side of the display panel PN.

In the meantime, as the plurality of flexible films COF are bent in the non-display area NA, the printed circuit board PCB connected to the data driver and the pad unit PAD moves to the rear surface of the display panel PN. As seen from the top of the display panel PN, a circuit element, such as the printed circuit board PCB connected to the data driver and the pad unit PAD may not be visible. Further, as the flexible film is bent, the size of the non-active area NA visible from the top of the display panel PN is reduced so that a narrow bezel may be implemented.

In the meantime, referring to FIGS. 2A and 2B, a bezel area BA1 at the first end of the display panel PN in which the plurality of flexible films COF are disposed may be larger than a bezel area BA2 at the second end of the display panel PN in which the plurality of flexible films COF are not disposed.

Figure 3A:
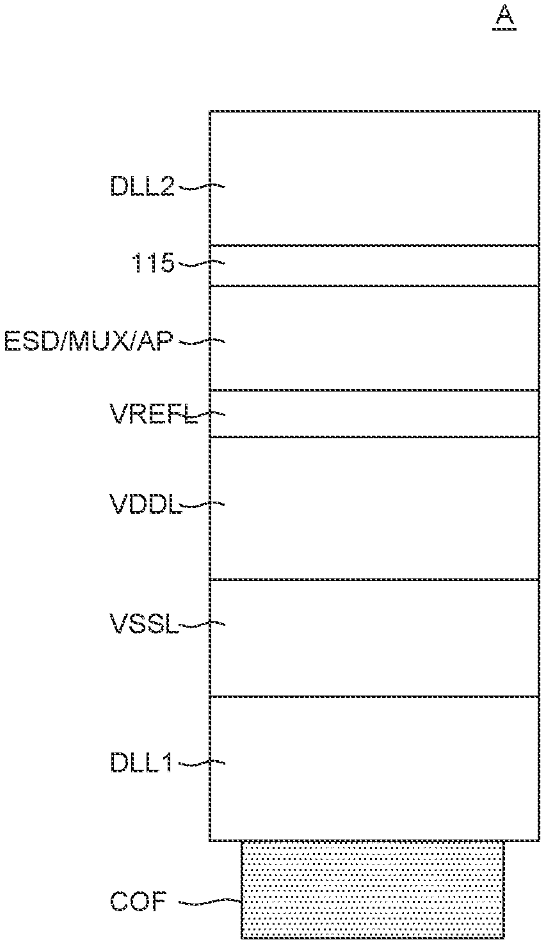
FIG. 3A is a schematic enlarged plan view of an area A of FIG. 1 according to an exemplary embodiment of the present disclosure.
Figure 3B:
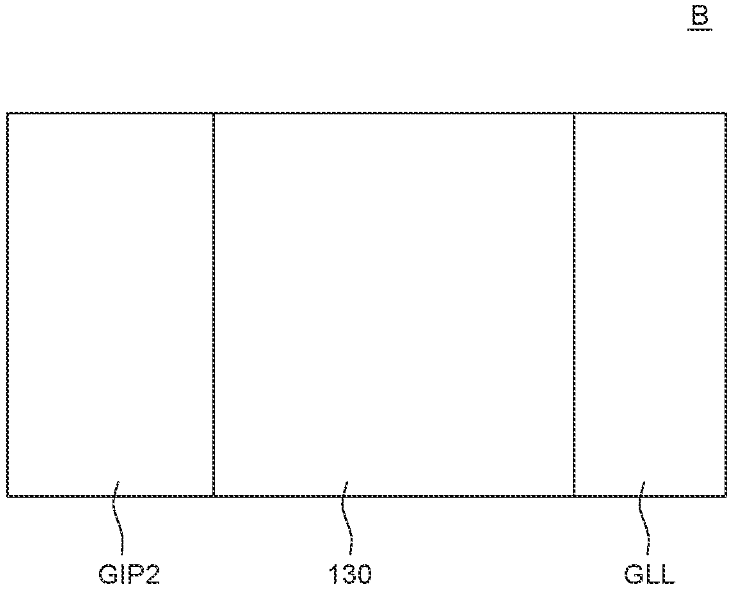
FIG. 3B is a schematic enlarged plan view of an area B of FIG. 1 according to an exemplary embodiment of the present disclosure.
Figure 4:
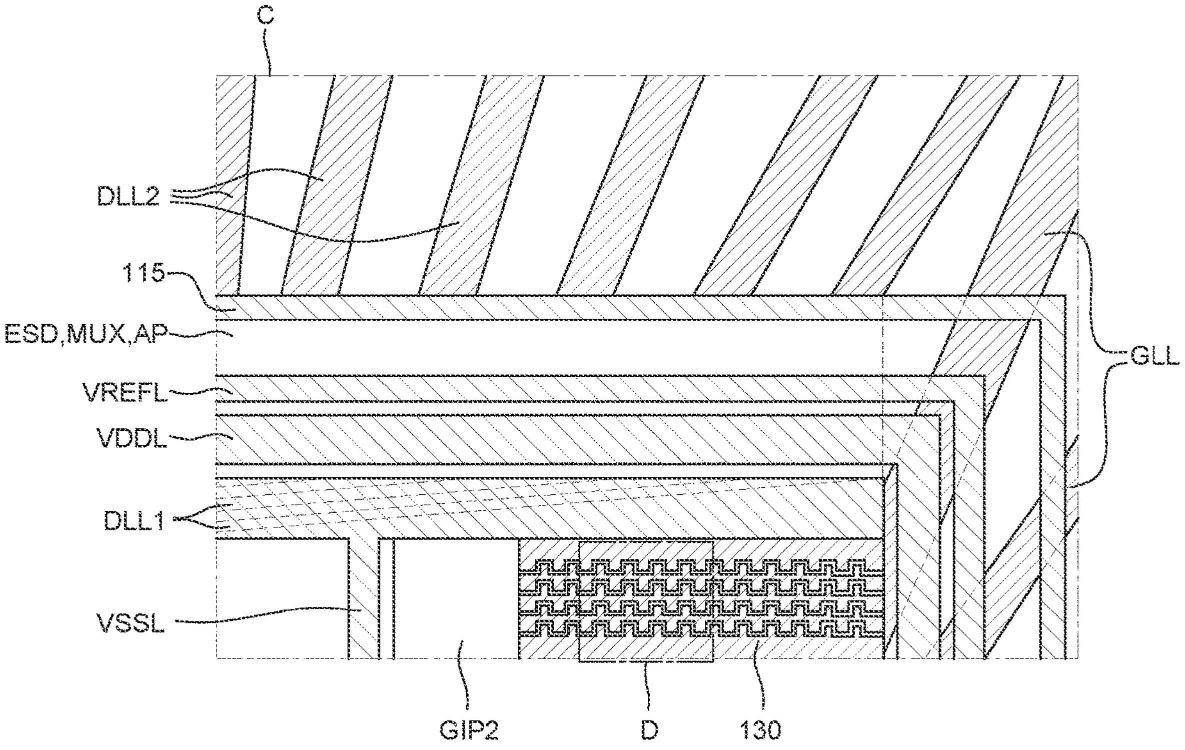
FIG. 4 is an enlarged plan view of an area C of FIG. 1 according to an exemplary embodiment of the present disclosure.

FIG. 3A is a schematic enlarged plan view of an area A of FIG. 1 according to one embodiment. FIG. 3B is a schematic enlarged plan view of an area B of FIG. 1 according to one embodiment. FIG. 4 is an enlarged plan view of an area C of FIG. 1 according to one embodiment. The area A is a schematic enlarged plan view for a non-active area NA of an outer periphery of the first area A1. The area B is a schematic enlarged plan view for a non-active area NA of an outer periphery of the second area A2. The area C is an enlarged plan view of a non-active area NA of a boundary area of the first area A1 and the second area A2. In FIGS. 3A and 3B, an area in which components are disposed is schematically illustrated in a rectangular shape. For the convenience of illustration, in FIGS. 3A and 3B, hatching is omitted for configurations excluding the flexible film COF. In FIG. 4, an antistatic circuit ESD, a multiplexer MUX (e.g., a multiplexer circuit), and an AP pad AP are schematically illustrated with rectangular dotted lines and hatching is omitted.

Referring to FIG. 3A, in the outer periphery of the first area A1, a plurality of second data link lines DLL2, a power line bar 115, an antistatic circuit ESD, a multiplexer MUX, an AP pad AP, a reference line VREFL, a high potential power line VDDL, a low potential power line VSSL, a plurality of first data link lines DLL1, a flexible film COF, and a printed circuit board PCB may be sequentially disposed from an area adjacent to the active area AA.

The plurality of second data link lines DLL2 are disposed between the active area AA and the multiplexer MUX and extends to the active area AA to be connected to the plurality of sub pixels. The plurality of second data link lines DLL2 may be formed of the same material as source electrodes or drain electrodes of a plurality of transistors disposed in the active area AA. For example, the plurality of second data link lines DLL2 may be a single layer or multiple layers formed of any one of molybdenum (Mo), aluminum (Al), chrome (Cr), gold (Au), titanium (Ti), nickel (Ni), neodymium (Nd), and copper (Cu) or an alloy thereof, but is not limited thereto.

The power line bar 115 may be disposed below the plurality of second data link lines DLL2 in the plan view. The power line bar 115 is connected to the high potential power line VDDL disposed below the multiplexer MUX in the plan view to transmit a high potential voltage to a sub pixel disposed in the display panel PN. The power line bar 115 may extend from the first area A1 to the second area A2. For example, the power line bar 115, as illustrated in FIG. 4, is disposed in an inverted "L" shape to extend to enclose outer peripheral areas of the first area A1 and the second area A2. That is, the power line bar 115 includes a portion that extends in the horizontal direction and a portion that extends in the vertical direction.

The multiplexer MUX, the AP pad AP, and the antistatic circuit ESD may be disposed below the power line bar 115 in the plan view. The multiplexer MUX, the AP pad AP, and the antistatic circuit ESD may be disposed to overlap each other or may be sequentially disposed in the corresponding space.

One end of the multiplexer MUX is electrically connected to the plurality of first data link lines DLL1 disposed in the outer peripheral area of the first area A1 and the other end is electrically connected to the plurality of second data link lines DLL2 extending to the active area AA of the first area A1. The multiplexer MUX may divide the data signal generated in the data driver to the plurality of data link lines. Accordingly, the multiplexer MUX may reduce the number of data link lines and specifically, reduce the number of the plurality of first data link lines DLL1 at a corner area which is a boundary portion of the first area A1 and the second area A2.

The AP pad AP may be disposed to be electrically connected to the plurality of gate lines and the plurality of data lines of the active area AA to inspect the short of the plurality of gate lines and the plurality of data lines and the lighting of the sub pixel.

The antistatic circuit ESD is electrically connected to the signal line disposed in the display panel PN to discharge static electricity entering through the signal line to suppress the damage of the display apparatus 100.

Referring to FIGS. 3A and 4, the reference power line VREFL, a low potential power line VSSL, and a high potential power line VDDL may be disposed below the multiplexer MUX, the AP pad AP, and the antistatic circuit ESD in the plan view. The reference power line VREFL, the low potential power line VSSL, and the high potential power line VDDL may be disposed to extend from the first area A1 to the second area A2. For example, the reference power line VREFL, the low potential power line VSSL, and the high potential power line VDDL, as illustrated in FIG. 4, are disposed in an inverted "L" shape to extend to enclose outer peripheral areas of the first area A1 and the second area A2. That is, each of the reference power line VREFL, the low potential power line VSSL, and the high potential power line VDDL includes a portion that extends in the horizontal direction and a portion that extends in the vertical direction.

Even though it is not illustrated in FIG. 4, the high potential power line VDDL may be connected to the power line bar 115 disposed there above and transmit a high potential power voltage (e.g., a second voltage) to each of the plurality of sub pixels disposed in the display panel PN. The high potential power line VDDL may be formed of the same material as source electrodes or drain electrodes of the plurality of transistors disposed in the active area AA. For example, the high potential power line VDDL may be a single layer or multiple layers formed of any one of molybdenum (Mo), aluminum (Al), chrome (Cr), gold (Au), titanium (Ti), nickel (Ni), neodymium (Nd), and copper (Cu) or an alloy thereof, but is not limited thereto.

The reference line VREFL may transmit a reference voltage (e.g., a third voltage) to each of the plurality of sub pixels disposed in the display panel PN. The reference line VREFL may be formed of the same material as source electrodes or drain electrodes of the plurality of transistors disposed in the active area AA. For example, the reference line VREFL may be formed of a single layer or multiple layers formed of any one of molybdenum (Mo), copper (Cu) or an alloy thereof, but is not limited thereto.

The low potential voltage line VSSL may transmit a low potential voltage (e.g., a first voltage that is less than the first voltage) to each of the plurality of sub pixels disposed in the display panel PN. The low potential power line VSSL may be formed of the same material as source electrodes or drain electrodes of the plurality of transistors disposed in the active area AA. For example, the low potential power line VSSL may be a single layer or multiple layers formed of any one of molybdenum (Mo), aluminum (Al), chrome (Cr), gold (Au), titanium (Ti), nickel (Ni), neodymium (Nd), and copper (Cu) or an alloy thereof, but is not limited thereto.

In the meantime, the reference power line VREFL and the high potential power line VDDL may be disposed between the second gate driver GIP2 and the active area AA in the second area A2 and the low potential power line VSSL may be disposed in the outer peripheral area of the second gate driver GIP2 in the second area A2. However, these are not limited thereto.

The plurality of first data link lines DLL1 may be disposed below the reference power line VREFL and the high potential power line VDDL in the plan view. As illustrated in FIG. 4, the plurality of first data link lines DLL1 may be disposed so as to overlap the low potential power line VSSL, but is not limited thereto.

The plurality of first data link lines DLL1 may be disposed on a different layer from the plurality of second data link lines DLL2. For example, the plurality of first data link lines DLL1 may be formed of the same material as gate electrodes of the plurality of transistors disposed in the active area AA. For example, the plurality of first data link lines DLL1 may be a single layer or multiple layers formed of any one of molybdenum (Mo), aluminum (Al), chrome (Cr), gold (Au), titanium (Ti), nickel (Ni), neodymium (Nd), and copper (Cu) or an alloy thereof, but is not limited thereto.

The plurality of flexible films COF and the printed circuit board PCB may be disposed on a lower end of the first area A1 and may be connected to the display panel PN in the first area A1.

Referring to FIGS. 3B and 4, the gate link line GLL, a plurality of compensation patterns 130, and the second gate driver GIP2 may be sequentially disposed from an area adjacent to the active area AA, in the outer periphery of the second area A2.

Referring to FIG. 3B, the plurality of gate link lines GLL in the second area A2 extends from the active area AA of the second area A2 to be connected to the second gate driver GIP2.

The plurality of gate link lines GLL may be formed of the same material as gate electrodes of the plurality of transistors disposed in the active area AA. For example, the plurality of gate link lines GLL may be a single layer or multiple layers formed of any one of molybdenum (Mo), aluminum (Al), chrome (Cr), gold (Au), titanium (Ti), nickel (Ni), neodymium (Nd), and copper (Cu) or an alloy thereof, but is not limited thereto.

In the meantime, the first area A1 is smaller than the second area A2 so that lengths of wiring lines disposed in the first area A1 and lengths of wiring disposed in the second area A2 may be different. That is, the second area A2 is disposed in an inner side from the first area A1 so that the length (e.g., a second length) of a second gate link line GLL disposed in the second area A2 may be shorter than the length (e.g., a first length) of a first gate link line GLL disposed in the first area A1. Therefore, there may be a difference in RC loads of the first gate link line GLL disposed in the first area A1 and the second gate link line of the second area A2. Therefore, a plurality of compensation patterns 130 may be disposed to compensate for a capacitance difference in the first area A1 and the second area A2.

The plurality of compensation patterns 130 may be disposed between the plurality of gate link lines GLL and the second gate driver GIP2. The plurality of compensation patterns 130 is disposed in an area of the second area A2 which protrudes past the lower end of the first area A1 and may connect the second gate driver GIP2 and the plurality of gate link lines GLL. For example, the plurality of compensation patterns 130 may be disposed lower than the low potential power line VSSL disposed in the first area A1 to have a long axis in a vertical direction.

In the meantime, in FIG. 4, it is illustrated that the plurality of compensation patterns 130 are disposed between the low potential power line VSSL and the high potential power line VDDL which are vertically disposed in the second area A2 downwardly protruding from the first area A1. However, it is not limited thereto and the plurality of compensation patterns may be disposed in the direction of the outer periphery of the second area A2 more than the low potential power line VSSL and the high potential power line VDDL.

The plurality of compensation patterns 130 will be described in more detail below with reference to FIGS. 5 and 6.

Figure 5:
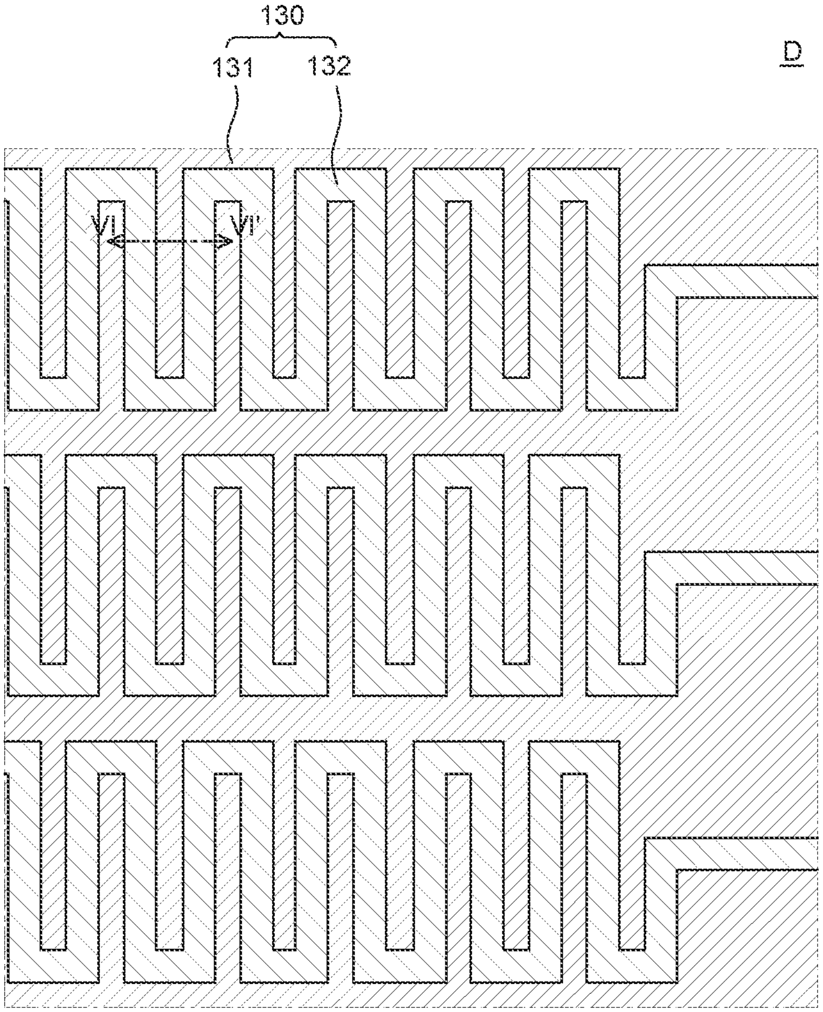
FIG. 5 is an enlarged plan view of an area D of FIG. 4 according to an exemplary embodiment of the present disclosure.

FIG. 5 is an enlarged plan view of an area D of FIG. 4 according to one embodiment. FIG. 6 is a cross-sectional view taken along the line VI-VI' of FIG. 5 according to one embodiment. FIG. 5 is an enlarged plan view of a plurality of compensation patterns 130.

The plurality of compensation patterns 130 may include a first metal layer 131 and a second metal layer 132 disposed to overlap with at least one or more insulating layers therebetween.

Figure 6:
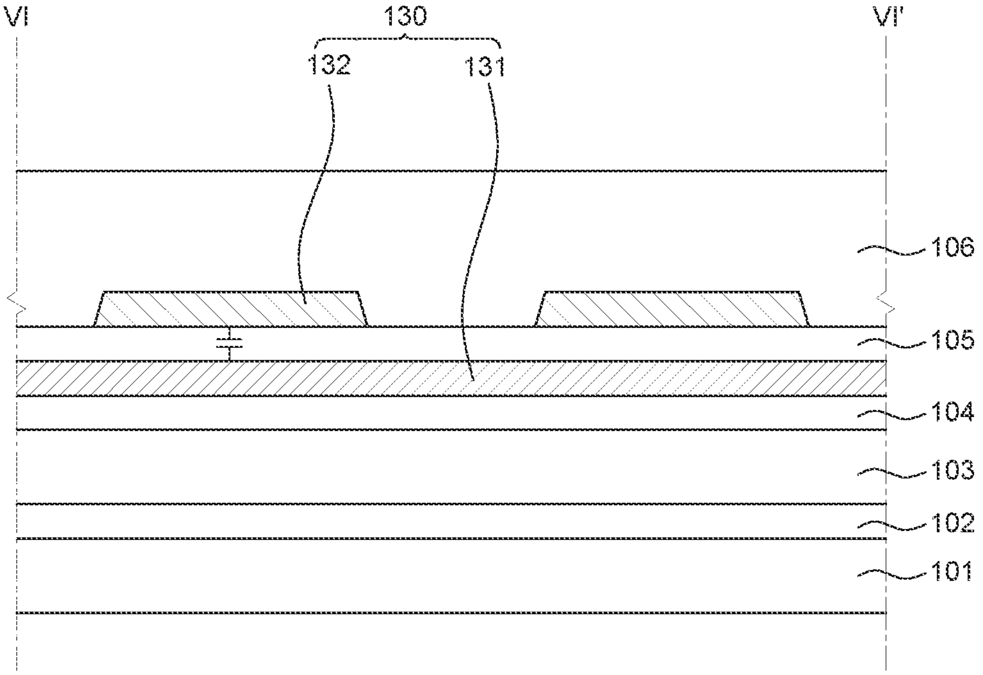
FIG. 6 is a cross-sectional view taken along the line VI-VI' of FIG. 5 according to an exemplary embodiment of the present disclosure.

For example, as illustrated in FIG. 6, the compensation pattern 130 may be disposed on a multi-buffer layer 102, an active buffer layer 103, and a gate insulating film 104 disposed on the substrate 101 and the first metal layer 131 and the second metal layer 132 may be disposed with a first interlayer insulating film 105 therebetween.

The first metal layer 131 of the plurality of compensation patterns 130 may be disposed between the second gate driver GIP2 and the plurality of gate link lines GLL. The first metal layer 131 may be formed of the same material as gate electrodes of the plurality of transistors disposed in the active area AA. The first metal layer 131 may be formed of a single layer or multiple layers formed of any one of molybdenum (Mo), aluminum (Al), chrome (Cr), gold (Au), titanium (Ti), nickel (Ni), neodymium (Nd), and copper (Cu) or an alloy thereof, but is not limited thereto.

In the meantime, the first metal layer 131 may be connected to a wiring line which transmits a constant voltage to the active area AA. For example, the first metal layer 131 is connected to a wiring line, such as the high potential power line VDDL, the low potential power line VSSL, and the reference line VREFL, in an area adjacent to the first area A1 to be applied with a voltage. In one embodiment, the high potential power line VDDL, the low potential power line VSSL, and the reference line VREFL are each considered a common power line since each of the high potential power line VDDL, the low potential power line VSSL, and the reference line VREFL supplies a corresponding voltage that is common to a plurality of pixels in the display device. However, it is not limited thereto and the first metal layer 131 may be floated.

The second metal layer 132 of the plurality of compensation patterns 130 may be disposed on the first metal layer 131. The second metal layer 132 may be formed of a single layer or multiple layers formed of any one of molybdenum (Mo), aluminum (Al), chrome (Cr), gold (Au), titanium (Ti), nickel (Ni), neodymium (Nd), and copper (Cu) or an alloy thereof, but is not limited thereto.

The second metal layer 132 of the plurality of compensation patterns 130 may connect the second gate driver GIP2 and the plurality of gate link lines GLL. The second metal layer 132 of the plurality of compensation patterns 130 may be disposed to have a different shape from the plurality of gate link lines GLL. For example, the plurality of gate link lines GLL may be disposed in a straight line in the second area A2 and the second metal layer 132 may be disposed in a wavy shape, such as a zigzag pattern, as illustrated in FIG. 5. That is, the second metal layer 132 includes a plurality of first portions that extend in the horizontal direction and a plurality of second portions that extend in the vertical direction where an end of each first portion is connected to an end of at least one of the second portions. Therefore, the length (e.g., a third length) of the compensation pattern 130 disposed in the same area may be longer than the length of the gate link line GLL. Thus, the length of the compensation pattern 130 is linger than the length of the gate link line GLL in the second area A2.

In the meantime, the second metal layer 132 is disposed to overlap the first metal layer 131 and the second metal layer 132 overlaps the first metal layer 131 to form a capacitance. Therefore, an RC delay value in the first area A1 and an RC delay value of the second area A2 according to the lengths of the wiring lines in the first area A1 and the second area A2 may become equal to each other and the luminance imbalance of the display apparatus 100 due to variation in capacitance and resistance may be reduced.

Figure 7:
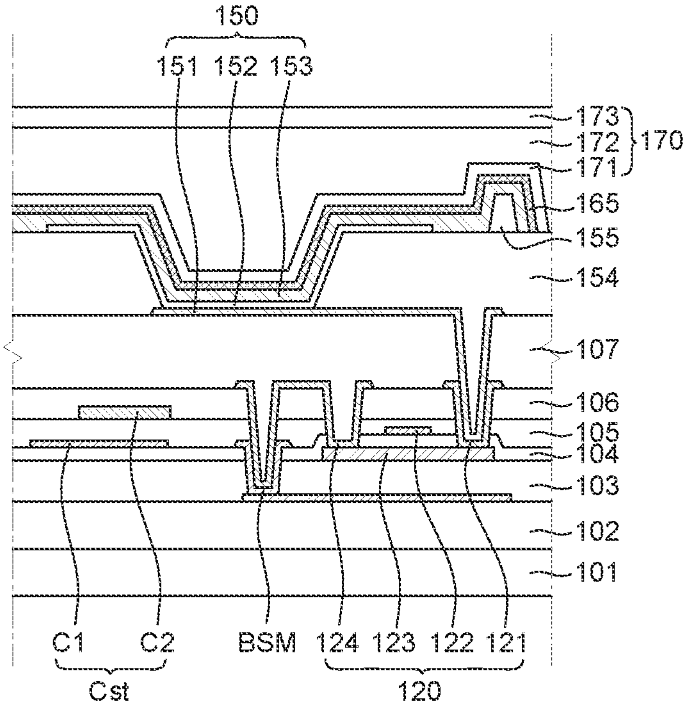
FIG. 7 is a cross-sectional view of a sub pixel of a display panel of a display apparatus according to an exemplary embodiment of the present disclosure.

FIG. 7 is a cross-sectional view of a sub pixel of a display panel of a display apparatus according to an exemplary embodiment of the present disclosure. Referring to FIG. 7, the display panel PN may include a substrate 101, a first transistor 120, a storage capacitor Cst, a light emitting diode 150, and an encapsulation layer 170.

The substrate 101 is a support member for supporting other components of the display apparatus 100 and may be configured by an insulating material. For example, the substrate 101 may be formed of glass or resin. Further, the substrate 101 may be configured to include plastics such as polymer or polyimide (PI) or may be formed of a material having a flexibility.

A multi-buffer layer 102 is disposed on the substrate 101. The multi-buffer layer 102 may reduce permeation of moisture or impurities through the substrate 101. The multi-buffer layer 102 may be formed by alternately laminating a-Si, silicon nitride SiNx, and silicon oxide SiOx at least one time.

A lower protection metal BSM is disposed on the substrate 101. The lower protection metal BSM is disposed below the plurality of transistors 120 to minimize or at least reduces damages of the plurality of transistors generated by charges trapped in the substrate 101.

The lower protection metal BSM may be formed of a single layer or multiple layers formed of any one of molybdenum (Mo), aluminum (Al), chrome (Cr), gold (Au), titanium (Ti), nickel (Ni), neodymium (Nd), and copper (Cu) or an alloy thereof, but is not limited thereto.

In the meantime, when the lower protection metal BSM is in a floating state, a potential of the lower protection metal BSM may vary during the operation of the display panel PN and a threshold voltage Vth of the plurality of transistors also may vary. Therefore, the lower protection metal BSM is connected to the source electrodes 121 or the drain electrodes 124 of the plurality of transistors. Therefore, the lower protection metal BSM forms an equal potential with the source electrodes 121 or the drain electrodes 124 to minimize the effect on the threshold voltage of the transistor.

An active buffer layer 103 is disposed on the multi-buffer layer 102 and the lower protection metal BSM. The active buffer layer 103 may protect the transistor 120 from impurities such as alkali ions leaked from the substrate 101. Further, the active buffer layer 103 may enhance an adhesiveness between layers formed above the active buffer layer 103 and the substrate 101. The active buffer layer 103 may be configured by a single layer or a double layer of a-Si, silicon oxide SiOx or silicon nitride SiNx, but is not limited thereto. In the meantime, the active buffer layer 103 may be omitted depending on the design.

The transistor 120 is disposed on the active buffer layer 103. The transistor 120 may include a source electrode 121, a gate electrode 122, a semiconductor layer 123, and a drain electrode 124.

The semiconductor layer 123 may be formed of any one of a polycrystalline semiconductor, an amorphous semiconductor, and an oxide semiconductor, but is not limited thereto.

A gate insulating film 104 is disposed on the semiconductor layer 123. The gate insulating film 104 is disposed on the semiconductor layer 123 to insulate the semiconductor layer 123 and the gate electrode 122 from each other. The gate insulating film 104 may be formed of an insulating material such as silicon oxide SiOx or silicon nitride SiNx or an insulating organic material.

The gate electrode 122 is disposed on the gate insulating film 104. The gate electrode 122 may be disposed so as to overlap the semiconductor layer 123. The gate electrode 122 may be a single layer or multiple layers formed of any one of molybdenum (Mo), copper (Cu) or an alloy thereof, but is not limited thereto.

A first interlayer insulating film 105 is disposed on the first gate electrode 122. The first interlayer insulating film 105 may be formed of an insulating material. The first interlayer film 105 may be formed of an insulating material such as silicon oxide SiOx or silicon nitride SiNx or an insulating organic material.

A second interlayer insulating film 106 is disposed on the first interlayer insulating film 105. The second interlayer insulating film 106 may be formed of an insulating material. The second interlayer insulating film 106 may be formed of an insulating material such as silicon oxide SiOx or silicon nitride SiNx or an insulating organic material.

The source electrode 121 and the drain electrode 124 may be a single layer or multiple layers formed of any one of molybdenum (Mo), aluminum (Al), chrome (Cr), gold (Au), titanium (Ti), nickel (Ni), neodymium (Nd), and copper (Cu) or an alloy thereof, but are not limited thereto.

In the meantime, a storage capacitor Cst may be disposed on the gate insulating film 104. As illustrated in FIG. 7, the storage capacitor Cst may include a storage lower electrode C1 and a storage upper electrode C2 which are disposed with the first interlayer insulating film 105 therebetween.

The storage lower electrode C1 is disposed on the gate insulating film 104. The storage lower electrode C1 may be formed of the same material on the same layer as the gate electrode 122. For example, the storage lower electrode C1 may be formed of a single layer or multiple layers formed of any one of molybdenum (Mo), aluminum (Al), chrome (Cr), gold (Au), titanium (Ti), nickel (Ni), neodymium (Nd), and copper (Cu) or an alloy thereof, but is not limited thereto.

The storage upper electrode C2 is disposed on the first interlayer insulating film 105. For example, the storage upper electrode C2 may be a single layer or multiple layers formed of any one of molybdenum (Mo), aluminum (Al), chrome (Cr), gold (Au), titanium (Ti), nickel (Ni), neodymium (Nd), and copper (Cu) or an alloy thereof, but is not limited thereto.

A planarization layer 107 is disposed on the second interlayer insulating film 106, the source electrode 121, and the drain electrode 124. The planarization layer 107 is an insulating layer which planarizes an upper portion of the substrate 101. The planarization layer 107 may be formed of an organic material, and for example, may be configured by a single layer or a double layer of polyimide or photo acryl, but is not limited thereto.

The planarization layer 107 may include a contact hole which electrically connects the transistor 120 and the anode 151. Specifically, the planarization layer 107 may include a contact hole which exposes any one of the source electrode 121 or the drain electrode 124 of the transistor 120.

The light emitting diode 150 is disposed on the transistor 120. The light emitting diode 150 includes an anode 151, an emission layer 152, and a cathode 153.

In the meantime, the display apparatus 100 may be implemented by a top emission type or a bottom emission type. In the case of the top emission type, a reflective layer which reflects light emitted from the emission layer 152 toward the cathode 153 may be disposed below the anode 151. For example, the reflective layer may include a material having an excellent reflectivity, such as aluminum (Al), or silver (Ag), but is not limited thereto. In contrast, in the case of the bottom emission type, the anode 151 may be formed only by a transparent conductive material. Hereinafter, the description will be made under the assumption that the display apparatus 100 according to the exemplary embodiment of the present disclosure is a top emission type.

The anode 151 is disposed on the planarization layer 107. The anode 151 may correspond to each of the plurality of sub pixels. That is, the anode 151 may be patterned so as to correspond to each of the plurality of sub pixels one by one. The anode 151 may be electrically connected to the source electrode 121 of the transistor 120 by means of a contact hole formed in the planarization layer 107.

The anode 151 may be formed of a conductive material having a high work function to supply holes to the emission layer 152. For example, the anode 151 may be formed with a transparent conductive material such as indium tin oxide (ITO) and indium zinc oxide (IZO), but is not limited thereto.

A bank 154 is disposed on the anode 151 and the planarization layer 107. The bank 154 may be formed on the planarization layer 107 so as to cover an edge of the anode 151.

The bank 154 is an insulating layer disposed between the plurality of sub pixels to divide the plurality of sub pixels. The bank 154 may be an organic insulating material. For example, the bank 154 may be formed of polyimide, acryl, or benzocyclobutene (BCB) resin, but it is not limited thereto.

A spacer 155 may be disposed on the bank 154. The spacer 155 may suppress a damage of the light emitting diode 150 which may be generated by a direct contact of a fine metal mask (FMM) used to form the emission layer 152 of the light emitting diode 150 and the bank 154 or the anode 151. The spacer 155 may be formed of the same material as the bank 154 or formed of a different insulating material from the bank 154, but is not limited thereto. Further, the spacer 155 and the bank 154 may be integrally formed at one time. As the spacer 155 is disposed on the bank 154, the cathode 153 may be disposed to cover the spacer 155 and the bank 154.

The emission layer 152 is disposed on the anode 151 and the bank 154. The emission layer 152 may be formed over the front surface of the substrate 101. That is, the emission layer 152 may be a common layer which is commonly formed in the plurality of sub pixels. The emission layer 152 may be an organic layer which emits light having a specific color. The emission layer 152 may include various layers, such as a hole transport layer, a hole injection layer, a hole blocking layer, an electron injection layer, an electron blocking layer, and an electron transport layer. In a tandem structure in which a plurality of emission layers overlaps, a charge generation layer may be further disposed between the emission layers.

The emission layer may be individually formed in every sub pixel to emit different color light from each sub pixel. For example, a red emission layer, a green emission layer, and a blue emission may be individually formed in every sub pixel. However, a common emission layer may be formed to emit white light without distinguishing colors for every pixel and a color filter which distinguishes colors may be separately provided.

The cathode 153 is disposed on the emission layer 152. The cathode 153 may be formed over the front surface of the substrate 101 as one layer. That is, the cathode 153 may be a common layer which is commonly formed in the plurality of sub pixels. The cathode 153 supplies electrons to the emission layer 152 so that the cathode may be formed of a conductive material having a low work function. For example, the cathode 153 may be formed of a transparent conductive material such as indium tin oxide ITO and indium zinc oxide IZO, or a metal alloy such as MgAg or an ytterbium (Yb) alloy and may further include a metal doping layer, but is not limited thereto.

An additional inorganic layer 165 may be disposed on the cathode 153. The additional inorganic layer 165 is disposed between the light emitting diode 150 and the encapsulation layer 170 to block moisture permeating the light emitting diode 150. The additional inorganic layer 165 may be formed of an inorganic material, such as silicon oxide SiOx, silicon nitride SiNx, silicon oxy nitride SiNxOy, or aluminum oxide AlyOz, but is not limited thereto.

The encapsulation layer 170 is disposed on the light emitting diode 150. The encapsulation layer 170 protects the light emitting diode 150 from moisture permeating from the outside of the display apparatus 100. The encapsulation layer 170 includes a first inorganic encapsulation layer 171, an organic encapsulation layer 172, and a second inorganic encapsulation layer 173.

The first inorganic encapsulation layer 171 is disposed on the cathode 153 to suppress the permeation of the moisture or oxygen. The first inorganic encapsulation layer 171 may be formed of an inorganic material, such as silicon oxide SiOx, silicon nitride SiNx, silicon oxy nitride SiNxOy, or aluminum oxide AlyOz, but is not limited thereto.

The organic encapsulation layer 172 is disposed on the first inorganic encapsulation layer 171 to planarize the surface. Further, the organic encapsulation layer 172 may cover foreign materials or particles which may be generated during a manufacturing process. The organic encapsulation layer 172 may be formed of an organic material, such as silicon oxy carbon SiOxCz, acryl or epoxy resin, but is not limited thereto.

The second inorganic encapsulation layer 173 is disposed on the organic encapsulation layer 172 and may suppress the permeation of the moisture or oxygen, like the first inorganic encapsulation layer 171. At this time, the second inorganic encapsulation layer 173 and the first inorganic encapsulation layer 171 may be formed to seal the organic encapsulation layer 172. Accordingly, the moisture or oxygen permeating the light emitting diode 150 may be effectively reduced by the second inorganic encapsulation layer 173. The second inorganic encapsulation layer 173 may be formed of an inorganic material, such as silicon oxide SiOx, silicon nitride SiNx, silicon oxy nitride SiNxOy, or aluminum oxide AlyOz, but is not limited thereto.

Figure 8A:
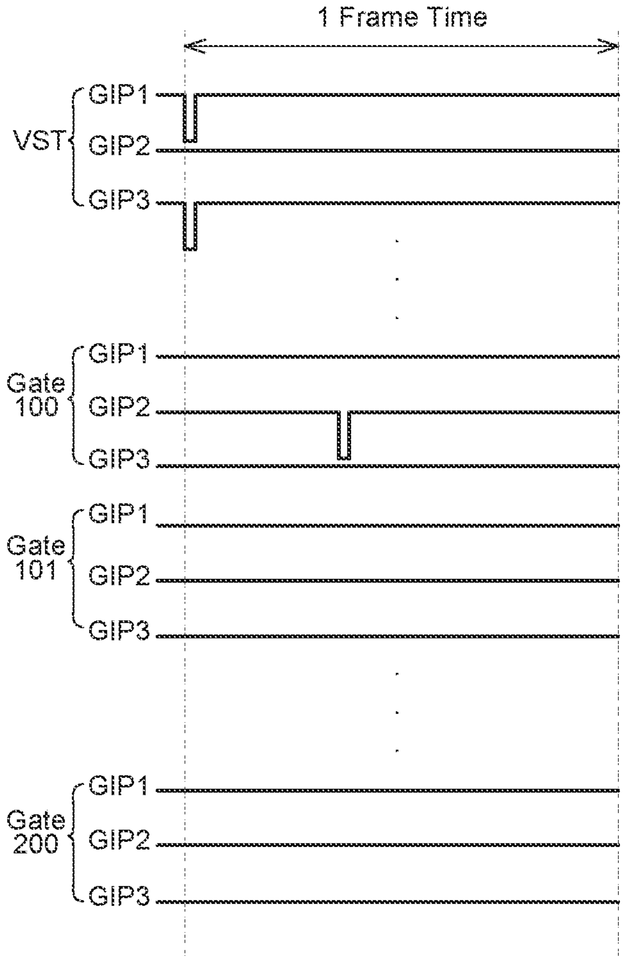
FIGS. 8A and 8B are waveforms illustrating a signal which is applied to a display apparatus according to an exemplary embodiment of the present disclosure for one frame time.
Figure 8B:
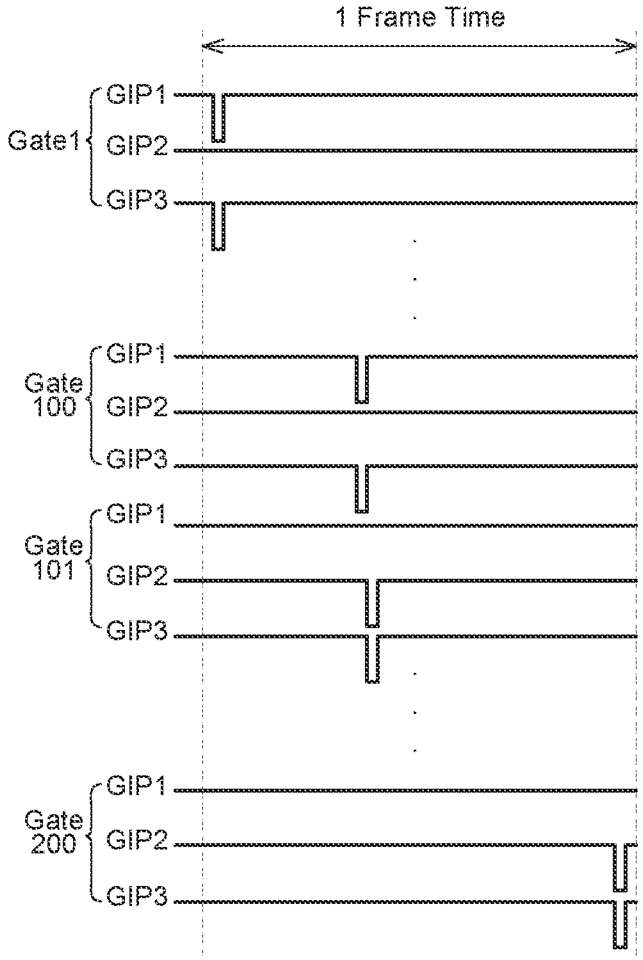

FIGS. 8A and 8B are waveforms illustrating a signal which is applied to a display apparatus according to an exemplary embodiment of the present disclosure for one frame time. FIG. 8A is a waveform illustrating a start signal VST which is applied to a gate driver according to an exemplary embodiment of the present disclosure for one frame time. FIG. 8B is a waveform illustrating a gate signal which is applied to a display apparatus 100 according to an exemplary embodiment of the present disclosure for one frame time. GateN of FIG. 8A refers to a timing when a gate signal is applied to an N-th gate line. For example, Gate100 refers to a timing when a gate signal is applied to a 100-th gate line Gate100 and Gate200 refers to a timing when a gate signal is applied to a 200-th gate line Gate200. GateN of FIG. 8B refers to an N-th gate line. In the display apparatus 100 according to the exemplary embodiment of the present disclosure, it is assumed that a total of 200 gate lines are disposed from one end to the other end of the display panel PN. It is also assumed that a first gate line Gate1 to a 100-th gate line Gate100 are connected to the first gate driver GIP1 and the third gate driver GIP3 and a 101-st gate line Gate101 to a 200-th gate line Gate200 are connected to the second gate driver GIP2 and the third gate driver GIP3.

A gate signal having two voltage levels of a high logic level and a low logic level may be applied to each of the first gate line Gate1 to the 200-th gate line Gate200 and the gate signal of the low logic level is sequentially output to the gate line for every horizontal period during one frame time. Further, a data signal may be applied to pixels on one horizontal line for every horizontal period. Here, even though a turn-on level is assumed as a low logic level, the turn-on level may be a high logic level.

In the display apparatus 100 according to the exemplary embodiment of the present disclosure, the gate drivers GIP1, GIP2, and GIP3 disposed at a left side of the display panel PN is divided into a first gate driver GIP1 and a second gate driver GIP2 to independently control a start line operation timing of the gate driver. Accordingly, the first gate driver GIP1 and the second gate driver GIP2 may be separately driven for one frame time and may be driven at different timings, respectively.

Referring to FIG. 8A, the first gate driver GIP1 and the third gate driver GIP3 may be applied with the start signal VST at a first timing of one frame time and the second gate driver GIP2 may be applied with the start signal VST at a timing later (e.g., a second timing) than the first gate driver GIP1 and the third gate driver GIP3. That is, the first gate driver GIP1 is applied with a first start signal VST and the third gate driver GIP3 is applied with a third start signal VST at a same timing as the first start signal VST, and the second gate driver GIP2 is applied with a second start signal VST at a timing that is after the first start signal VST of the first gate driver GIP1 and the third start signal VST of the third gate driver GIP2. One frame time may include a first time period in which the first gate driver GIP1 is driven and a second time period in which the second gate driver GIP2 is driven and the second time period is later than (e.g., after) the first time period. Further, as illustrated in FIG. 8B, the third gate driver GIP3 may output the same signal as the first gate driver GIP1 for the first time period and output the same signal as the second gate driver GIP2 for the second time period. That is, the third gate driver GIP3 outputs a first signal at a same time that the first gate driver GIP1 outputs a signal during the first time period, and the third gate driver GIP3 outputs a second signal at same time that the second gate driver GIP2 outputs a signal during the second time period.

For example, as illustrated in FIGS. 8A and 8B, at the start timing of one frame time, the first gate driver GIP1 is applied with the gate start signal VST and outputs a gate signal to the first gate line Gate1. Next, the first gate driver GIP1 may sequentially output the gate signal from the second gate line Gate2 to the 100-th gate line Gate100.

At the start timing of one frame time, the third gate driver GIP3 is applied with the gate start signal VST and outputs the gate signal to the first gate line Gate1. Next, the third gate driver GIP3 may sequentially output the gate signal from the second gate line Gate2 to the 200-th gate line Gate200.

The second gate driver GIP2 may be applied with the start signal VST at a timing when the gate signal is applied to the 100-th gate line Gate100. The second gate driver GIP2 is connected to the 101-st gate line Gate101 to the 200-th gate line Gate200 to be applied with the start signal VST at a timing when the gate signal is applied to the 100-st 100-st gate line Gate100, rather than the start timing of one frame time. Next, the second gate driver GIP2 may sequentially output the gate signal to the 101-st gate line Gate101 to the 200-th gate line Gate200.

In the display apparatus for a vehicle of the related art, a plurality of flexible films is disposed on top of the display panel. Further, the flexible film disposed on top of the display panel is bent to the rear side of the display panel to reduce a bezel area on top of the display panel.

In the meantime, even though the flexible film is bent to the rear side of the display panel, an area to which the flexible film is bent is required as well as a pad area to attach a flexible film on top of the display panel so that it is restricted to reduce the bezel area. Specifically, in the case of the display panel for a vehicle, the bezel area on top of the display panel which is disposed to be adjacent to glass is relatively perceived by a user more than the bottom of the display panel so that the aesthetics of the display apparatus is deteriorated.

Accordingly, in the display apparatus 100 according to the exemplary embodiment of the present disclosure, the plurality of flexible films 160 is disposed on the bottom of the display panel PN to reduce an upper bezel of the display panel PN. That is, in the display apparatus 100 according to the exemplary embodiment of the present disclosure, a margin for bending the plurality of flexible films 160 and a pad area for attaching the display panel PN and the plurality of flexible films 160 may be removed from the top of the display panel PN. Therefore, a bezel width of an upper area of the display panel PN in which the bezel is relatively visible to the user may be reduced to improve the aesthetics of the display apparatus 100.

Further, in the display apparatus 100 according to the exemplary embodiment of the present disclosure, the plurality of compensation patterns 130 are disposed in the second area A2. Therefore, the plurality of compensation patterns 130 forms a capacitance to compensate for an RC load difference which may be generated by the size difference between the first area A1 and the second area A2. By doing this, an RC delay value in the first area A1 and an RC delay value of the second area A2 may be equal to each other and the luminance imbalance of the display apparatus 100 due to variation in capacitance and resistance may be reduced.

The exemplary embodiments of the present disclosure can also be described as follows:

According to an aspect of the present disclosure, there is provided a display apparatus. The display apparatus comprises a display panel which includes a first area and a second area extending from one side of the first area, and a plurality of flexible films connected to the display panel, wherein an interval between one end and the other end of the first area is smaller than an interval between one end and the other end of the second area and the plurality of flexible films is connected to the one end of the first area and the one end of the second area.

The other end of the first area and the other end of the second area may be located on the same line and the one end of the first area may be located inside more than the one end of the second area.

The display panel may further include a gate driver which is disposed in an outer periphery in a column direction, and the gate driver may include a first gate driver disposed in a left area of the first area, a second gate driver disposed in a left area of the second area, and a third gate driver disposed in a right area of the second area.

The first gate driver and the second gate driver may be driven at different timings, respectively.

The first gate driver and the second gate driver may be separately driven for one frame time.

The one frame time may include a first time period in which the first gate driver may be driven and a second time period in which the second gate driver may be driven, and the second time period may be later than the first time period.

The third gate driver may output the same signal as the first gate driver for the first time period and output the same signal as the second gate driver for the second time period.

The first gate driver and the third gate driver may be applied with a start signal at the same timing and the second gate driver may be applied with the start signal at a timing later than those of the first gate driver and the third gate driver.

The display apparatus may further include a plurality of gate link lines which transmits a scan signal from the gate driver; and a plurality of compensation patterns which connects the second gate driver and the plurality of gate link lines.

The first gate driver and the second gate driver may be directly connected to the plurality of gate link lines.

The plurality of compensation patterns may have different shape from the plurality of gate link lines.

The compensation pattern may include a first metal layer and a second metal layer disposed on the first metal layer, and the first metal layer may be connected to a common power line connected to the second area.

The display apparatus may further comprise a low potential power line, a high potential power line, and a reference line which extend from an outer periphery of the first area to an outer periphery of the second area.

The display panel may further includes a multiplexer (MUX) circuit unit disposed in a lower end of the active area, a plurality of transistors including a gate electrode, a source electrode, and a drain electrode and a plurality of first data link lines which extends from the multiplexer (MUX) circuit unit in the first area and may be disposed toward a center of the first area and a plurality of second data link lines which is disposed in the outer periphery of the first area, and the first data link lines may be formed of the same material as the gate electrode and the second data link lines may be formed of the same material as the source electrode and the drain electrode.

The display panel may be a display panel for a vehicle and the first area may be disposed in front of a driver seat.

According to another aspect of the present disclosure, there is provided a display apparatus. The display apparatus comprises a display panel which includes a first area and a second area extending from one side of the first area, and a plurality of flexible films connected to the display panel, wherein a lower end of the second area downwardly protrudes more than a lower end of the first area and the plurality of flexible films is connected to the lower end of the first area and the lower end of the second area.

The display panel may further include a gate driver which is disposed in an outer periphery in a column direction, and the gate driver may include a first gate driver disposed in one side of the first area and a second gate driver disposed in an area of the second area protruding more than the first area.

The display panel may further include a plurality of gate link lines which transmits a scan signal from the gate driver and a plurality of compensation patterns which is disposed in the area of the second area protruding more than the first area and connects the second gate driver and the plurality of gate link lines.

The display apparatus may further comprise a third gate driver which is disposed on the other side of the second area and is connected to the first gate driver and the second gate driver, wherein the first gate driver and the third gate driver are applied with a start signal at the same timing and the second gate driver is applied with the start signal at a timing later than those of the first gate driver and the third gate driver.

Although the exemplary embodiments of the present disclosure have been described in detail with reference to the accompanying drawings, the present disclosure is not limited thereto and may be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto. Therefore, it should be understood that the above-described exemplary embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A display apparatus, comprising:

a display panel including:

a first area including a first end that extends in a first direction, a second end that extends in the first direction and is spaced apart from the first end in a second direction that is different from the first direction, a first side that extends in the second direction, and a second side that extends in the second direction and is spaced apart from the first side in the first direction; and a second area extending from the first side of the first area, the second area including a first end that protrudes past the first end of the first area, a second end that is aligned with the second end of the first area along the first direction, a first side that extends in the second direction and is spaced apart from the first side of the first area in the first direction, and a second side that extends in the second direction and is aligned with the first side of the first area;

a gate driver including a first gate driver at the second side of the first area, a second gate driver at the second side of the second area that is aligned with the first side of the first area, and a third gate driver at the first side of the second area; and a plurality of flexible films connected to the display panel, wherein a distance between the first end and the second end of the first area is less than a distance between the first end and the second end of the second area, wherein the plurality of flexible films are connected to the first end of the first area and the first end of the second area but not the second end of the first area and the second end of the second area, wherein flexible films of the plurality of flexible films connected to the second area are disposed at the first end of the second area that protrudes past the first end of the first area, and wherein the display panel further includes a plurality of gate link lines that transmit a scan signal from the gate driver and a plurality of compensation patterns that are disposed at the second side of the second area that protrudes past the first end of the first area and connects the second gate driver and the plurality of gate link line.

2. The display apparatus according to claim 1, wherein the first gate driver is driven at a first timing and the second gate driver is driven at a second timing that is different from the first timing.

3. The display apparatus according to claim 2, wherein the first gate driver and the second gate driver are separately driven for one frame time.

4. The display apparatus according to claim 3, wherein the one frame time includes a first time period in which the first gate driver is driven and a second time period in which the second gate driver is driven, and the second time period is after the first time period.

5. The display apparatus according to claim 4, wherein the third gate driver outputs a signal at a same time that the first gate driver outputs a signal during the first time period and the third gate driver outputs a signal at a same time that the second gate driver outputs a signal during the second time period.

6. The display apparatus according to claim 2, wherein the first gate driver is applied with a first start signal and the third gate driver is applied with a third start signal at a same timing as the first start signal, and the second gate driver is applied with a second start signal at a timing that is after the same timing of the first start signal of the first gate driver and the third start signal of the third gate driver.

7. The display apparatus according to claim 1, wherein the first gate driver is directly connected to the plurality of gate link lines.

8. The display apparatus according to claim 7, wherein the plurality of compensation patterns have a shape that is different from a shape of the plurality of gate link lines.

9. The display apparatus according to claim 1, wherein the plurality of compensation patterns comprise:

a first metal layer; and a second metal layer on the first metal layer, wherein the first metal layer is connected to a common power line connected to the second area.

10. The display apparatus according to claim 1, further comprising:

a first potential power line that supplies a first voltage, a second potential power line that supplies a second voltage that is less than the first voltage, and a reference line that supplies a third voltage which extend from an outer periphery of the first area to an outer periphery of the second area.

11. The display apparatus according to claim 10, wherein the display panel further includes:

a multiplexer circuit in a lower end of an active area that includes the first area and the second area;

a plurality of transistors each including a gate electrode, a source electrode, and a drain electrode;

a plurality of first data link lines that extends from the multiplexer circuit in the first area and are disposed toward a center of the first area; and a plurality of second data link lines that are disposed in the outer periphery of the first area, and wherein the plurality of first data link lines include a same material as the gate electrode and the plurality of second data link lines include a same material as the source electrode and the drain electrode.

12. The display apparatus according to claim 1, wherein the display panel is included in a vehicle and the first area is disposed in front of a driver seat and the second area is disposed in front of a passenger seat.

13. A display apparatus, comprising:

a display panel including:

a first area including a first end that extends in a first direction, a second end that extends in the first direction and is spaced apart from the first end in a second direction that is different from the first direction, a first side that extends in the second direction, and a second side that extends in the second direction and is spaced apart from the first side in the first direction; and a second area extending from the first side of the first area, the second area including a first end that protrudes past the first end of the first area, a second end that is aligned with the first second end of the first area along the first direction, a first side that extends in the second direction and is spaced apart from the first side of the first area in the first direction, and a second side that extends in the second direction and is aligned with the first side of the first area;

a gate driver including a first gate driver at the second side of the first area, a second gate driver at the second side of the second area that is aligned with the first side of the first area, and a third gate driver at the first side of the second area;

a plurality of flexible films connected to the first end of the first area and the first end of the second area of the display panel, wherein flexible films of the plurality of flexible films connected to the second area are disposed at the first end of the second area that protrudes past the first end of the first area, and wherein the display panel further includes a plurality of gate link lines that transmit a scan signal from the gate driver and a plurality of compensation patterns that are disposed at the second side of the second area that protrudes past the first end of the first area and connects the second gate driver and the plurality of gate link lines.

14. The display apparatus according to claim 13, wherein the first gate driver is applied with a first start signal and the third gate driver is applied with a third start signal at a same timing as the first start signal, and the second gate driver is applied with a second start signal at a timing that is after the same timing of the first start signal of the first gate driver and the third start signal of the third gate driver.

15. The display apparatus according to claim 13, wherein a length of the first side of the second area is greater than a length of the second side of the first area, and a length of the third gate driver is greater than respective lengths of the first gate driver and the second gate driver.

16. A display device comprising:

a display panel including a first area and a second area extending from a first side of the first area that extends in a first direction such that a second side of the second area that extends in a second direction that is different from the first direction protrudes past a second side of the first area in a plan view of the display device, the second area larger than the first area;

a plurality of flexible films connected to the second side of the first area and the second side of the second area;

a gate driver configured to supply a scan signal;

a plurality of first link lines in the first area having a first length, the plurality of first link lines applying the scan signal to the first area;

a plurality of second link lines in the second area having a second length that is shorter than the first length, the plurality of second link lines applying the scan signal to the second area; and a plurality of compensation patterns that connect the gate driver to the plurality of second link lines in the second area, the plurality of compensation patterns having a third length that is longer than the second length.

17. The display device of claim 16, wherein each of the plurality of compensation patterns includes a plurality of first portions that extend in the first direction and a plurality of second portions that extend in the second direction such that each first portion from the plurality of first portions is connected to at least one second portion from the plurality of second portions.

18. The display device of claim 16, wherein the gate driver comprises:

a first gate driver at a third side of the first area that extends in the first direction and spaced apart from the first side of the first area, the first gate driver connected to the plurality of first link lines; and a second gate driver at a third side of the second area that extends in the first direction from the first side of the first area, the second gate driver connected to the plurality of compensation patterns.

19. The display device of claim 18, wherein the plurality of compensation patterns comprise:

a first metal layer; and a second metal layer on the first metal layer with an insulating layer between the first metal layer and the second metal layer, the second metal layer connecting the second gate driver to the plurality of second link lines;

wherein the first metal layer is connected to a common power line connected to the second area.

20. The display device of claim 19, further comprising:

a plurality of transistors in the first area and the second area, each transistor including a gate electrode, a source electrode, and a drain electrode, wherein the first metal layer includes a material that is a same as a material of the gate electrode of at least one of the plurality of transistors and the plurality of second link lines include a same material as the source electrode and the drain electrode.

* * * * *